US006098571A

United States Patent [19]

Axelrod et al.

[11] Patent Number: 6,098,571

[45] Date of Patent: Aug. 8, 2000

[54] ANIMAL TREAT DISPENSING TOY

[75] Inventors: Glen S. Axelrod; Gary Hersch, both of Neptune City, N.J.

[73] Assignee: T.F.H. Publications, Neptune City, N.J.

[21] Appl. No.: 09/175,021

[22] Filed: Oct. 16, 1998

[51] Int. Cl.[7] .......... A01K 29/00

[52] U.S. Cl. .......... 119/707; 119/710

[58] Field of Search .......... 119/707, 702, 119/708, 709, 710, 711, 51.01; D30/160; 473/569, 571, 594; D21/713, 720

[56] References Cited

U.S. PATENT DOCUMENTS

| | | | |
|---|---|---|---|
| Re. 34,352 | 8/1993 | Markham et al. | 119/710 |
| D. 214,928 | 8/1969 | Swett et al. . | |
| D. 287,988 | 1/1987 | Billinghurst | D21/713 |
| D. 373,859 | 9/1996 | Markham et al. | D30/160 |
| D. 387,513 | 12/1997 | Mauldin, Jr. | D30/160 |
| D. 388,559 | 12/1997 | Mauldin, Jr. | D30/160 |
| D. 396,904 | 8/1998 | Leu | D32/30 |
| 2,003,957 | 6/1935 | Salisbury . | |
| 2,086,631 | 7/1937 | Munro . | |
| 4,802,444 | 2/1989 | Markham et al. | 119/29 |
| 5,009,193 | 4/1991 | Gordon | 119/711 |
| 5,131,665 | 7/1992 | Myers | 473/600 |
| 5,148,769 | 9/1992 | Selinger | 119/29 |
| 5,390,629 | 2/1995 | Simone | 119/711 |
| 5,499,403 | 3/1996 | Harrigan | 2/247 |
| 5,505,161 | 4/1996 | Swendseid | 119/708 |
| 5,640,931 | 6/1997 | Markham | 119/711 |
| 5,709,165 | 1/1998 | Nurmikko | 119/51.01 |
| 5,758,604 | 6/1998 | Jorgensen | 119/711 |
| 5,799,616 | 9/1998 | McClung, III | 119/709 |
| 5,819,690 | 10/1998 | Brown | 119/707 |
| 5,832,877 | 11/1998 | Markham | 119/710 |
| 5,865,147 | 2/1999 | Rubin | 119/711 |
| 5,870,971 | 2/1999 | Krietzman et al. | 119/707 |
| 5,924,908 | 7/1999 | O'Heir | 119/707 |
| 5,947,061 | 9/1999 | Markham et al. | 119/710 |

*Primary Examiner*—Peter M. Poon
*Assistant Examiner*—Yvonne R. Abbott
*Attorney, Agent, or Firm*—Hayes, Soloway, Hennessey, Grossman & Hage, P.C.

[57] ABSTRACT

A pet toy amusement device which self-regulates the delivery of a pet treat of a selected size and shape, comprising an inner housing for containing the pet treat of a selected size and shape, the housing including one or a plurality of openings for dispensing such treat. The device also incorporates an outer housing to contain the inner housing, wherein the inner housing is movable within the outer housing, the outer housing also containing one or a plurality of openings for teat dispensing. The number, size and/or shape of one or plurality of openings on the inner and outer housing can be conveniently varied with respect to the number, size and/or shape of the treats such that when the device is motioned by a pet, the device self-regulates pet treat delivery.

9 Claims, 3 Drawing Sheets

16

20

10

ANIMAL TREAT DISPENSING TOY

FIELD OF THE INVENTION

This invention is directed to an apparatus and a method for persons to interact with an animal wherein the animal is self-engaged and observed to relate mutually with said apparatus and a reward or treat is dispensed which can be conveniently adjusted to automatically disburse and reward the animal at a selected rate, depending upon the degree of animal interaction. The invention herein is suitable for use, therefore, with dogs, cats and/or small mammals.

BACKGROUND OF THE INVENTION

The prior art reveals a variety of devices for playing with animals and for teaching them various behaviors, including such things as chewable toys, plastic bones, artificial animals, and Frisbee™ devices. In addition, artificial mice, rubber and plastic balls, rattles, bells and stuffed articles, such as balls and bags stuffed with cloth and catnip are some of the types of conventional pet toys currently in use.

Although cats, dogs and other pets do play with these toys by swatting, pushing and carrying them about, most pets seem to prefer a toy which appears alive and moves on its own without continuous contact by the pet. Unfortunately for the pet owner, the use of such toys typically requires human power; i.e., they are human operated and become tiresome to use. Such toys also suffer from the drawback in that the pet may not be interested in playing with the toy at the same time that the pet owner takes the time to manipulate the toy. The result is often a pet toy which goes unused or discarded.

Accordingly, efforts have recently centered on developing toys which appear to move on their own or toys which reward the animal with a treat and the like, in order to provoke a continued and independent animal interest. For example U.S. Pat. No. 5,148,769, entitled "Amusement Device Having Suction Cup Base and Interchangeable Pet Toy" discloses a toy for pet which includes an arcuate shaped spring-like wire removably mounted at one end to a suction cup base extending generally upwardly and sidewardly therefrom. The free end of the wire has a toy removably suspended therefrom. The base is removably mounted to a mounting surface as by suction, and which mounting surface may be a variety of combinations.

Attention is also directed to U.S. Pat. No. 5,505,161, entitled "Pendant Pet Toy" discloses a toy such as a stuffed mouse mounted above a floor by an elastic cord attached to a resilient clamp. The clamp is adapted to grip opposite sides of a wall or door frame to suspend the toy in midair.

Other U.S. Patents uncovered in a search of the prior art relating to dog treat devices include U.S. Pat. No. 5,499,403 entitled "Disposable Pocket for Animal Treats". This patent discloses a disposable pocket for temporary attachment to a person's outer garment and for receiving and holding an animal treat. The pocket is said to contain front and back panels joined together by a leakproof scam, and the pocket is also described as being manufactured from greaseproof material. The rear panel is made to contain a pressure sensitive adhesive along with a peel-off backing for protecting the adhesive prior to use.

Also worthy of note is U.S. Pat. No. 5,799,616 entitled "Animal Interaction Method". This patent discloses a method for a person to interact with an animal the method comprising a person throwing a plate on which at least one item is releasably mounted, retrieving the plate by the animal for the person, releasing of the item from the plate by the person, and giving the item to the animal.

Furthermore, along such review of the prior art, attention is directed to a product manufactured by Ethical Products, Inc., under the tradename "Roll-A-Treat", which is described as a treat and training ball for dogs. More specifically, treats or food are placed inside an opaque plastic ball, and an interior dispensing mechanism works like a labyrinth and the dog treat product (which must be of a shape suitable for travel within the labyrinth) falls out a single round hole.

Accordingly, a need exists for additional improved pet toy designs, which will automatically dispense treats of any desired shape, and which will also allow the pet and the pet owner to more easily see the contents, and which toy would be suitable for use with different animals, including dogs, cats and small mammals. In addition, a need exists for such a device wherein the outer surfaces of the device can be made of durable materials to resist animal chewing, and wherein the treat delivery mechanism is simpler and more efficient, and less prone to jamming and/or blockage of a single opening design. All told, a need exists for improved pet toys which are self-animated and which do not require regular and constant actuation by, or the presence of, the pet owner, which toys are based on an efficient and simplified self-regulating mechanical delivery system.

SUMMARY OF THE INVENTION

A pet toy amusement device which self-regulates the delivery of a pet treat of a selected size and shape, comprising an inner housing for containing said pet treat of a selected size and shape, said housing containing one or a plurality of openings for dispensing said treat. The outer housing is arranged to contain said inner housing, wherein said inner housing is movable within said outer housing and said outer housing also contains one or a plurality of openings for dispensing said treat. The number, size and/or shape of said one or plurality of openings on said inner and outer housing are then made to vary with respect to the number, size and/or shape of said treats such that when said device is motioned by a pet, said device self-regulates the delivery of said pet treat to the pet.

DETAILED DESCRIPTION OF THE PREFERRED EMBODIMENTS

Figure 1:
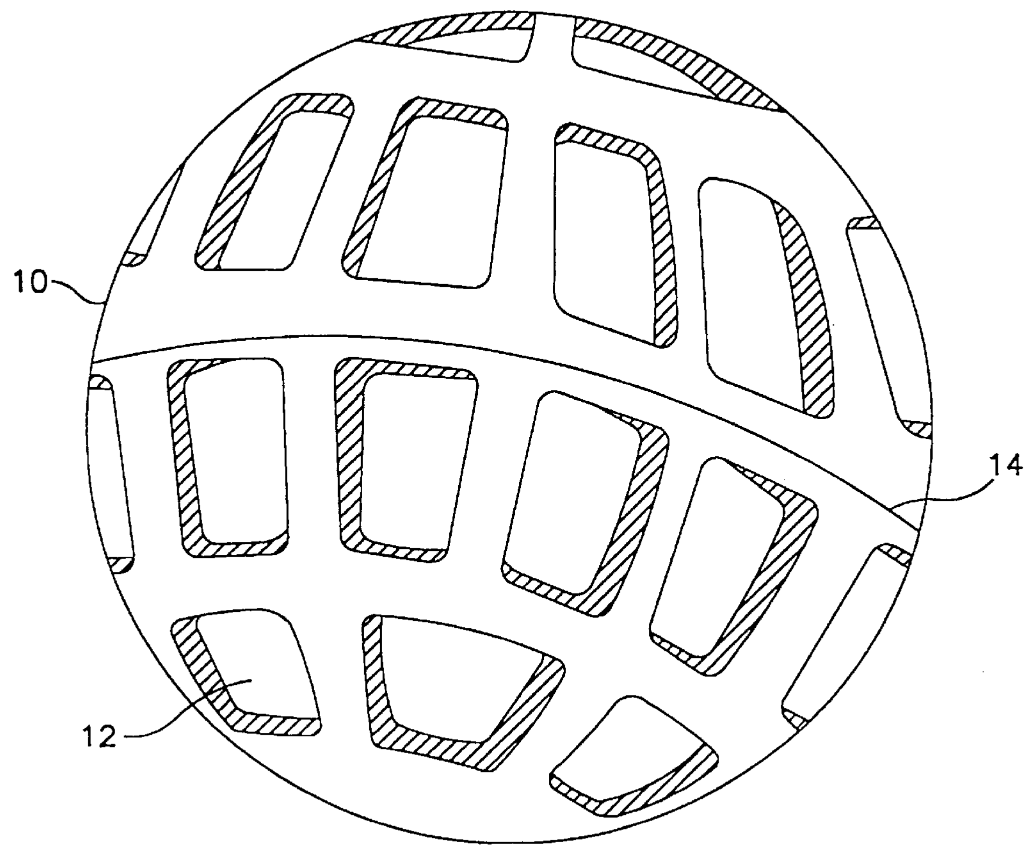
FIG. 1 illustrates the outer housing of the present invention containing openings of various geometric size and shape.

With reference to FIG. 1, the present invention in a preferred embodiment comprises an outer housing 10 containing openings 12 which openings vary in number, size and geometric shape. More specifically, openings 12 will be of a polygonal shape and preferably contain the characteristic geometric features of a rectangle, square, trapezoid, oval and/or circle. In addition, preferably, the outer housing 10 is comprised of two sections, releasably engaged to one another at 14 such that the two sections can be, e.g., screwed one into another for use in accordance with the features of the present invention.

Figure 2:
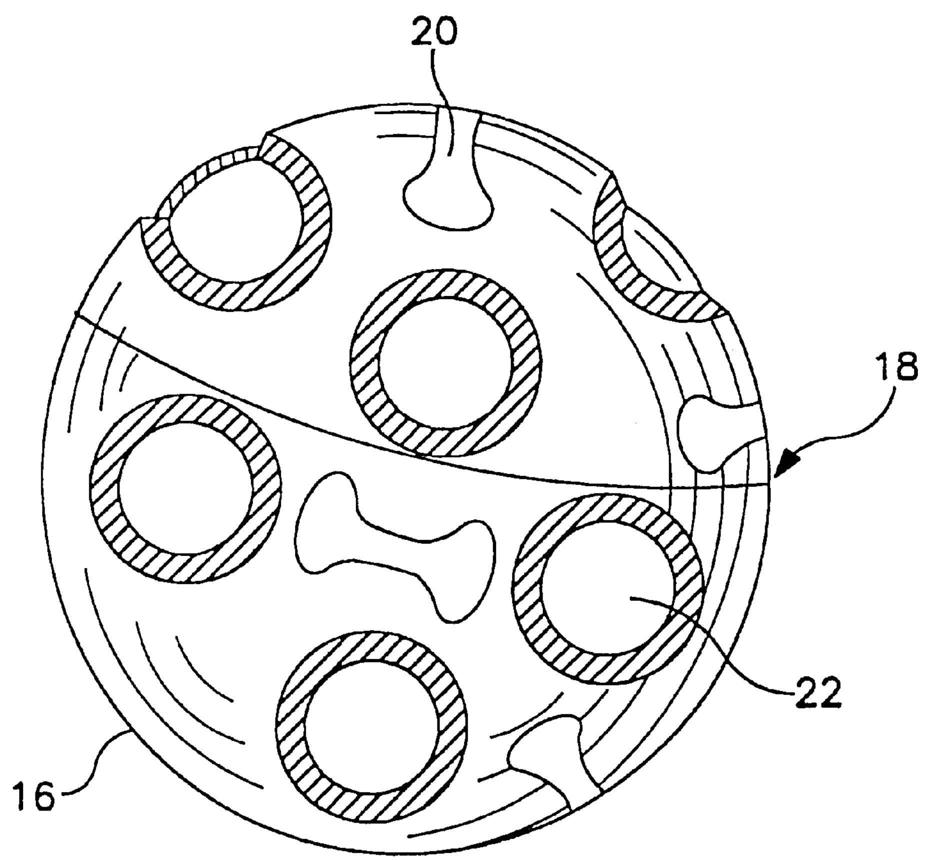
FIG. 2 illustrates the inner housing of the present invention containing opening in the preferred shape of a dog bone treat.

FIG. 2 illustrates the preferred inner housing construction 16 which inner housing is also preferably made in two sections and releasably engaged along line 18. Inner housing 16 is made to contain pet treats of varying shape and size, and in addition, contains one or a plurality of openings 20 for dispensing said treats. As shown in preferable embodiment, the opening 20 is in the general shape of a dog bone treat, although other treat shapes are contemplated, and a plurality of such openings are placed about the inner housing 16, which inner housing is also illustrated in the general shape of a ball. In addition, inner housing 16 optionally contains other cosmetic or structural type surface features 22 which as shown appear as crater-like formations. In that sense, surface features 22 can optionally comprise ribs or other types of molded-in indentations or protrusions, which serve to reinforce the strength of the inner ball construction.

In accordance with the present invention, various materials have been found suitable for the manufacture of the outer 10 and inner housing 16. Along such lines, thermoplastic and thermoset plastic materials have been found suitable, as well as elastomeric type materials. In a particularly preferred embodiment, the outer housing 10 is manufactured from a durable material to resist the animal chewing it apart, and accordingly, is made thicker than the inner housing component. Preferably, inner housing 16 is made of a translucent or transparent material, so that, when in use, the treats contained within inner housing 16 will be visible both to the user and the pet. In that regard, translucent or transparent type thermoplastic, thermoset or elastomeric materials can be selected from the following types of polymeric resins: polystyrene, polycarbonate, poly(methyl methacrylate), polyacrylate, polysulphone, poly(ether imide), poly-4-methyl-1-pentene, polyethylene, polyethylene copolymers, poly(vinyl chloride), polypropylene, styrene-acrylonitrile copolymer, polyamides, silicon polymers, polyurethane and/or epoxy.

In addition, the outer and/or inner housing 10 and 16 may also be preferably comprised of a metallic material, wherein the size of the outer housing 10 is again made larger than inner housing 16, yet of a size suitable for accomodating entry by a small mamal. That is, a small mamal would then be able to enter into and through the outer housing 16, and by then moving inner housing 16, be rewarded with a treat. In this situation, the use of a metallic material either the outer or inner housing is preferred since small mammals tend to chew, and the metallic housing would obviate such problem.

Figure 3:
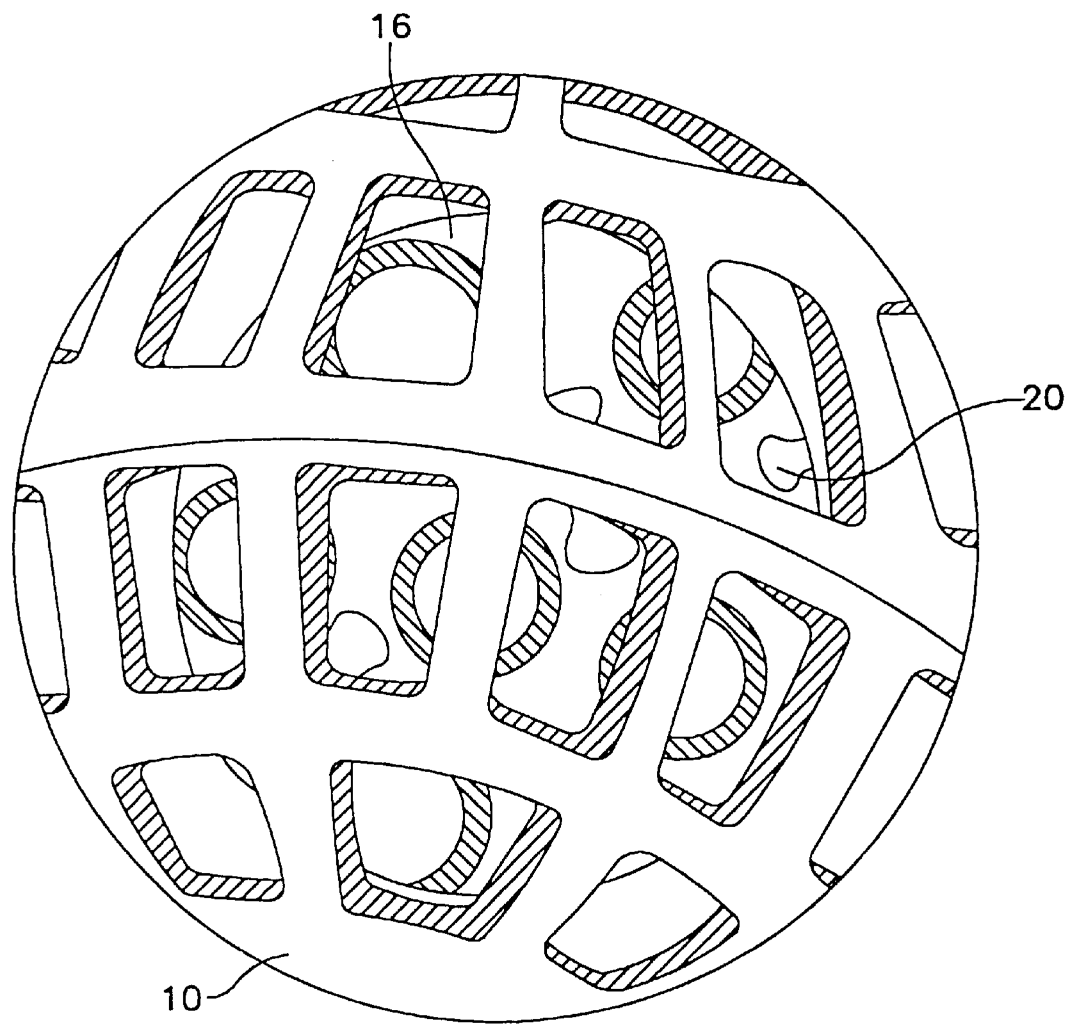
FIG. 3 illustrates the invention herein, with the inner housing placed within the outer housing therein providing a self-regulating animal treat dispensing toy.

Attention is next directed to FIG. 3 which illustrates the animal treat dispensing toy of the present invention in its assembled configuration. That is, outer housing 10 is again shown in its preferred ball-shape form such that it contains inner housing 16. As inner housing is charged with pet treats in the form of dog bone, such dog bones will, upon movement or rolling of the toy, ultimately find their way through opening 20 of the inner housing and will automatically be disbursed to the animal when exiting the toy through opening 12. That being the case, the animal becomes self-engaged with the toy of the present invention and the treat which is disbursed engages the animal to continue moving the ball, for further reward.

In addition, upon review of FIG. 3, it will become apparent that although the inner housing is illustrated with an opening 20 in the shape of a dog bone, other types of openings can be readily accommodated. In addition, by selecting a particular size and/or shape, and by adjustment of the number of openings 20, relative to the size, shape and number of openings on the outer housing 10, the device herein can be readily made to self-regulate the delivery of a pet treat to a pet, as opposed to the more complicated designs of the prior art. Finally, it will be appreciated that the inner housing preferable contains a pet food treat which selectively compensates the pet at a selected rate for said pets interaction. In addition, the inner housing may optionally contain a bell or other similar sounding device, wherein said bell or sounding device is activated to project its sound when motioned by the pet.

In conclusion, therefore, it is seen that the present invention and the embodiments disclosed herein and those covered by the appended claims are well adapted to carry out the objectives and obtain the goals set forth. Certain changes can be made in the subject matter without departing from the spirit and scope of the invention. It is realized that changes are possible within the scope of this invention and it is further intended that each element or step recited in any of the following claims is to be understood as referring to all equivalent elements or steps. The following claims are therefore intended to cover the invention as broadly as legally possible in whatever form it may be utilized.

What is claimed is:

1. A pet toy amusement device which self-regulates the delivery of a pet treat of a selected number, size and shape, comprising:

one or a plurality of pet treats;

an inner housing for containing said one or plurality of pet treats of a selected size and shape, said housing containing one or a plurality of openings for dispensing said one or plurality of pet treats;

an outer housing containing said inner housing, wherein said inner housing is movable within said outer housing, said outer housing containing one or a plurality of openings for dispensing said one or plurality of pet treats;

wherein the number, size and/or shape of said one or plurality of openings on said inner and outer housing vary with respect to said number, size and/or shape of said treats such that when said device is motioned by a pet, said device self-regulates the delivery of said one or plurality of pet treats to a pet, further characterized in that said openings on said outer housing do not permit passage of said inner housing for its removal.

2. The pet toy amusement device of claim 1 wherein said one or plurality of openings on said inner housing are relatively smaller in opening area size than said one or plurality of openings on said outer housing.

3. The pet toy amusement device of claim 1, wherein said one or plurality of openings on said outer housing contains the characteristic geometric shape of a rectangle, square, trapezoid, pyramid, polygon, oval, and/or circle.

4. The pet toy amusement device of claim 1, wherein said inner housing is translucent or transparent.

5. The pet toy amusement device of claim 1 wherein said inner and outer housing each comprise two sections, which sections can be releasably engaged to one another.

6. The pet toy amusement device of claim 1, wherein said inner and outer housings are manufactured from thermoplastic, elastomeric or thermoset materials.

7. The pet toy amusement device of claim 1, wherein said inner housing is manufactured from polystyrene, polycarbonate, poly(methyl methacrylate), polyacrylate, polysulphone, poly(ether imide), poly-4-methyl-1-pentene, polyethylene, polyethylene copolymers, poly(vinyl chloride), polypropylene, styrene-acrylonitrile copolymer, polyamides, silicon polymers, polyurethane, or epoxy polymer.

8. The pet toy amusement device of claim 1, wherein said inner housing is in the shape of a ball, and said outer housing is in the shape of a ball, such that the inner housing can freely move and rotate within said outer housing, when motioned by a pet.

9. The pet toy amusement device of claim 1, wherein the inner housing contains a sounding device, wherein said sounding device is activated to sound when motioned by said pet.

* * * * *